United States Patent [19]

Schlunke

[11] Patent Number: 4,920,932
[45] Date of Patent: May 1, 1990

[54] RELATING TO CONTROLLING EMISSIONS FROM TWO STROKE ENGINES

[75] Inventor: Christopher K. Schlunke, Kingsley, Australia

[73] Assignee: Orbital Engine Company Pty. Ltd., Balcatta, Australia

[21] Appl. No.: 326,836

[22] Filed: Mar. 21, 1989

Related U.S. Application Data

[63] Continuation of Ser. No. 253, 408, Oct. 4, 1988, abandoned, which is a continuation of 866, 426, May 23, 1986, abandoned.

[30] Foreign Application Priority Data

May 24, 1985 [AU] Australia ................. PH0729

[51] Int. Cl.⁵ .................................. F02B 33/04
[52] U.S. Cl. ........................... 123/65 PE; 60/312; 123/73 C
[58] Field of Search ............ 123/73 C, 65 P, 65 PE, 123/376, 398, 403, 295, 478, 323, 65 V; 60/312, 314

[56] References Cited

U.S. PATENT DOCUMENTS

| | | | |
|---|---|---|---|
| 3,911,873 | 10/1975 | Dave | 123/90.15 |
| 3,969,614 | 7/1976 | Moyer et al. | 123/480 |
| 4,009,695 | 3/1977 | Ule | 123/90.12 |
| 4,111,178 | 9/1978 | Casey | 123/416 |
| 4,232,637 | 11/1980 | Pichard | 123/295 |
| 4,285,311 | 8/1981 | Iio | 123/323 |
| 4,341,188 | 7/1982 | Nerstrom | 123/65 PE |
| 4,388,894 | 6/1983 | Tanaka et al. | 123/63 PE |
| 4,391,234 | 7/1983 | Holzleitner | 123/65 PE |
| 4,399,788 | 8/1983 | Bostelmann | 123/65 PE |
| 4,495,924 | 1/1985 | Ueno et al. | 123/478 |
| 4,545,346 | 10/1985 | Grow | 123/73 R |
| 4,700,684 | 10/1987 | Pischinger et al. | 123/568 |

FOREIGN PATENT DOCUMENTS

| | | | |
|---|---|---|---|
| 3103732A1 | 1/1981 | Fed. Rep. of Germany | |
| 291086 | 10/1928 | United Kingdom | 123/65 PE |
| 2134596 | 8/1984 | United Kingdom | |

Primary Examiner—David A. Okonsky
Attorney, Agent, or Firm—Armstrong, Nikaido, Marmelstein, Kubovcik & Murray

[57] ABSTRACT

Method and apparatus for controlling emissions, particularly of unburnt hydrocarbons, from a two stroke engine. The engine has direct in-cylinder fuel injection and has in the air inlet port and the exhaust port respective devices to control the flow therethrough. The devices are each independently controlled in relation to engine load demand and engine speed to regulate the mass of exhaust gases retained in the combustion chamber. The exhaust flow control device perferably also alters the timing of opening and closing of the exhaust port.

39 Claims, 6 Drawing Sheets

HC EMISSION COMPARISON

RELATING TO CONTROLLING EMISSIONS FROM TWO STROKE ENGINES

This application is a continuation of application Ser. No. 253,408, filed Oct. 4, 1988, which is a continuation of Ser. No. 866,426, filed on May 23, 1986, both now abandoned.

This invention relates to internal combustion engines operating on the two stroke cycle and is particularly directed to controlling the combustion process so that the harmful components of the engine exhaust are kept within permissible limits.

Engines operating on the two stroke cycle have been recognised as exhibiting poor performance in both the area of fuel consumption and the level of harmful emissions in the engine exhaust. However, there are substantial benefits to be obtained by wider use of engines operating on the two stroke cycle, firstly, because of their relatively simple construction, and secondly because of their relatively high power to weight ratio. There is accordingly a need to develop a two stroke engine wherein the exhaust emissions can be brought within the acceptable limits laid down by the various government bodies throughout the world, particularly for automotive and marine applications.

In a conventional crankcase compression two stroke engine a pre-mixed charge of fuel and air is delivered to or prepared in the crankcase and is subsequently transferred to the combustion chamber through an inlet or transfer port or ports which communicates the combustion chamber with the crankcase, as the piston reciprocates in the cylinder. Having regard to the extent and nature of movement of the pre-mixed charge between the time of its initial formation and its final compressed state in the combustion chamber, immediately prior to ignition, a high degree of mix between the fuel and the air takes place. This results in a relatively even distribution of the fuel throughout the air charge in the combustion chamber and is commonly referred to as a homogeneous charge. Accordingly, any part of this pre-mixed charge which passes to the exhaust system in an unburnt condition is relatively high in hydrocarbon (HC), and represents an emission control problem. The unburnt charge may pass to the exhaust system by a "short circuiting" gas flow between the transfer and exhaust ports and also from unburnt charge remaining after combustion ceased.

After a homogeneous charge of the correct fuel/gas ratio has been ignited, such as by a spark from a spark plug, combustion will spread through the charge so long as the charge temperature is sufficient to not extinguish the flame front. In an engine the charge is subjected to various quenching effects, such as contact with the cylinder walls, that can lower the temperature of that part of the charge in close proximity thereto. Accordingly, it is practice to use a somewhat rich fuel/gas mixture to promote combustion further into the quenched areas of the charge. This can in some engines reduce the actual quantity of unburnt charge but that unburnt portion is rich in fuel, and hence HC, and so counter-acts to varying degrees the benefit of extending the flame-front.

It has also been proposed to stratify the fuel distribution in an engine charge so that the charge closer to the point of ignition is richer in fuel and the charge is progressively leaner as the distance from the ignition point increases. This means that the parts of the charge furthermost from the ignition point, and hence most likely not to combust, are lean in respect of fuel and hence also HC. However, a lean mixture is more susceptible to extinguishing of the flame-front and therefore a great proportion of the charge may remain unburnt with resultant increase in HC.

U.S. Pat. No. 3817227 by Onishi is directed to improving the combustion efficiency of a two stroke cycle engine and purification of the exhaust gas therefrom. The Onishi specification discloses an engine wherein a pre-mixed fuel-air charge is delivered by the crankcase compression through transfer ports to the engine cylinder. Because of the manner of preparation of the fuel-air charge it is of a pre-mixed form and will be substantially a homogeneous charge when delivered to the engine cylinder.

The Onishi specification proposes to control the velocity of the fuel-air charge entering the cylinder, and thereby control the extent of mixing of the incoming fuel/air charge with the residual exhaust gas remaining in the engine cylinder from the previous engine cycle. It is stated in the Onishi specification that, by reducing the velocity of the incoming fuel/air mixture, a form of stratification between the fuel/air mixture and the residual exhaust gas is achieved, and this prevents the exhaust gas leaning-out the fuel/air mixture and so reducing the combustibility thereof, and concentrates the incoming fuel-air mixture in the recess provided in the cylinder head.

The control of the velocity of the incoming gas mixture as proposed by Onishi is achieved by coupling the conventional throttle valve in the air intake passage with a similar throttle valve in exhaust passage slightly downstream of the exhaust port. The mechanical linkage coupling the two throttle valves is arranged to provide a non-linear but fixed relation between the movement of the exhaust throttle valve in response to the movement of the intake throttle valve. This fixed relationship is illustrated graphically in FIG. 6 of the Onishi specification and described with reference to that graph.

It will be appreciated that in a pre-mixed charged engine as described by Onishi the throttle position on the air intake primarily determines the engine load. At low load the intake throttle is near closed and at maximum load it is fully open independent of engine speed. Accordingly, the control system proposed by Onishi's does not account for the engine speed at which the particular load is being experienced.

It is considered that the inability of the proposal by Onishi to take account of the engine speed would seriously detract from it's ability to effectively control exhaust emissions, particularly hydrocarbons. It is well known that the scavenging process of two stroke engines, including the velocity of the incoming fuel-air charge and the outgoing exhaust gases, is significantly influenced by the magnitude and frequency of the pressure pulses in the exhaust system, and these in turn are highly influenced by and dependent on the engine speed. The throttling of the exhaust port as proposed by Onishi will influence the pressure pulses in the exhaust system and hence influence the velocity of gas movements in the cylinder. However, as this throttling is not related to engine speed its effectiveness will be reduced, and under certain circumstances may be detrimental to achieving the required gas flow condition in the engine cylinder.

It is therefore the principal object of the present invention to provide a method of operating a two stroke internal combustion engine whereby the combustion process may be controlled throughout the working range of the engine to produce acceptable exhaust emission levels particularly in regard to hydrocarbons.

With this object in view there is provided a method of operating an internal combustion engine on the two stroke cycle to control the level of contaminants in the exhaust gases, the engine having a cylinder, a piston mounted in the cylinder and connected to a crankshaft to reciprocate in the cylinder in response to rotation of the crankshaft, said piston and cylinder defining a combustion chamber that cyclically varies in volume as the piston reciprocates, an air inlet port providing communication between the combustion chamber and a source of air, and an exhaust port providing communication between the combustion chamber and an exhaust duct, said inlet and exhaust ports being arranged to be opened and closed by the piston as it reciprocates in the cylinder in time relation with the rotation of the crankshaft; said method comprising admitting a charge of air to the combustion chamber through the inlet port, compressing the charge of air in the combustion chamber by the movement of the piston after the inlet and exhaust ports have been closed, injecting a metered quantity of fuel into the air charge, igniting said fuel charge, and exhausting products of combustion through the exhaust port after expansion in the combustion chamber, sensing the engine load and engine speed while the engine is operating, and controlling the flow of gases in the combustion chamber in a predetermined relation to engine speed and load while the exhaust port is open to thereby regulate the mass of the products of combustion retained in the combustion chamber at closure of the ports so that the hydrocarbons present in the exhausted products of combustion is below a predetermined level.

Conveniently the control of the flow of the gas is achieved by controlling the flow through the inlet and exhaust ports, which not only individually controls the flow through each port but, since in the engine cycle there are periods when both ports are open, has also a synergistic effect, as both ports influence the pressure conditions in the combustion chamber and hence the gas flow therein and therethrough. Also, the control of the flow in the exhaust port influences the pressure pulses in the exhaust system, which may be used to control the scavenging of the combustion chamber and/or the retention of the charge therein.

Preferably the control of the gas flow in the combustion chamber is by the use of respective throttle devices in association with each of the inlet and exhaust ports, and controlling the throttle devices by an electronic control unit (ECU) that receives signals in response to engine load and speed. The throttle devices, particularly the one associated with the exhaust port may be arranged to also effect a variation in the timing of the port opening and closing.

It is necessary in order to obtain the required control of the combustion chamber gas charge, and so control the exhaust emission levels, to have independent control of the flow through the inlet and exhaust ports. Within the operating speed range of the engine it is necessary to be capable of opening the exhaust throttle as the inlet throttle is opened, or the fueling rate (load) is increased at one particular speed, while at another speed the exhaust throttle is restricted as the inlet throttle is opened. It may also be necessary at some speed in the operating speed range to open and then restrict the exhaust throttle as the inlet throttle is opened to respond to an increasing air requirement. It is therefore appreciated that there is no fixed or consistent relation between inlet and exhaust throttle positions over the load-speed range of the engine.

This independent but related control of the inlet and exhaust port throttling gives the required flexibility in control of the pressure fluctuations at the exhaust port and corresponding flexibility in the control of the scavenging process. It is necessary to be capable of varying the pressure fluctuations in both timing and magnitude with both engine speed and load, so as to achieve the required variation in amount of exhaust gas retained in the combustion chamber and hence control the HC emissions.

A further advantage can be achieved by variation of the exhaust port opening and closing timing which also influences the timing of the pressure fluctuations at the exhaust port. Exhaust port timing control is also useful in improving torque in the low speed range while also maintaining control of the level of exhaust emissions.

The use of direct injection of the metered quantity of fuel into the combustion chamber, enables the establishment of a fuel distribution within the air charge in a stratified form, with the richer mixture being in close proximity to the ignition point, and the mixture progressively leaning out as the distance from the point of injection increases. This enables the overall fuel-air ratio to be decreased so the engine runs leaner, and yet the mixture in the vicinity of the igniter is sufficiently rich to ensure reliable ignition of the fuel-air charge. Also, as the mixture is richer in the vicinity of initial ignition, the mixture in the remaining portion of the combustion chamber charge will resultantly be leaner, and will be substantially leaner than a homogeneous pre-mixed charge. Accordingly, if the flame is extinguished before it has moved through the full extent of the fuel in the combustion chamber, due to various quenching effects, the unburnt portion of the charge will be very lean and will therefore contain a reduced HC, and thus the HC content of the exhaust gas will be reduced.

The benefits of the stratification of the fuel in the air charge are further enhanced by the presently proposed control of the gas flow through the inlet and exhaust ports regulating the quantity of exhaust gas retained in the combustion chamber at the closing of the exhaust port. This retained exhaust gas is at a relatively high temperature and accordingly will raise the temperature of the new charge entering the combustion chamber on the next cycle. The resulting temperature increase of the new fuel/gas charge will improve the flamability of the lean portion of the charge, so that the flame front will extend further into the lean portion of the charge, and consequently the final quantity of unburnt fuel is reduced with a corresponding reduction in HC in the exhaust gases.

The quantity of retained exhaust gas is controlled in accordance with the engine load and speed, so that, at all points in the engine operating range, the amount of heat available from the retained exhaust gas is sufficient to raise the charge temperature to achieve the acceptable level of HC in the released exhaust gas. It will be appreciated that retaining part of the exhaust gas in the engine cylinder results in the gas being at a higher temperature than if part of the exhaust gas was recycled into the incoming air charge.

It is recognised that in a conventional two stroke cycle engine the portion of the exhaust gas that would normally leave the cylinder late in the exhaust period has a relatively high HC content. Accordingly the retention of that portion of the exhaust gas or part thereof in the cylinder contributes significantly to HC emission control.

It has previously been recognised that the mixing of exhaust gas with the air/fuel mixture does contribute to the reduction in the NOx contaminant in an engine exhaust gas. In many prior proposals, exhaust gas has been mixed with the air/fuel mixture to obtain a substantially homogeneous charge. However, an increase in the proportion of exhaust gas in a homogeneous charge can lead to instability in the engine operation. In particular, it has been shown that the air/fuel ratio at which lean misfire is experienced in a engine becomes richer as the amount of exhaust gas in the total charge increases.

The combustion process and mixture preparation proposed by the present invention enables the benefit of NOx reduction by the presence of exhaust gases in the engine charge with a reduced effect of this exhaust gas on the stability of the engine. This is achieved by the fact that the exhaust gases are not recirculated into the incoming fuel air charge, but are retained in the combustion chamber at the conclusion of the previous cycle. The retained exhaust gas is thus mixed to a lesser degree with the fresh charge of air, resulting in a degree of stratification of the fresh charge and the retained exhaust gases, with the fresh charge being concentrated in the areas closer to the point of injection of the fuel. This contributes to the more stable operation of the engine, which of course, is further assisted by the stratified form of the fuel charge. The combined effect is that the fuel is principally stratified in the fresh air charge, which in turn is stratified in relation to the retained exhaust gases.

In a conventional engine having a homogeneous charge of fuel, air and exhaust gas, a significant part of the NOx formation derives from the early part of the combustion as the flame front travels from the ignition point. This is due primarily to the high temperature attained during this period, and also the relatively high proportion of the cycle time in which these temperature conditions prevail. Also in an engine with a conventional stratified fuel charge where the overall air/fuel ratio is near stoichiometry and the stratification is from rich to lean with respect to the ignition point, then NOx formation occurs primarily during the mid portion of the combustion cycle, where the flame temperature and hence the suitability for NOx generation is high due in part to the relatively high fuel/air ratio, and where there is good oxygen availability and a considerable period of time available under conditions most suitable for the promotion of NOx formation.

The control of the preparation of the cylinder charge as presently proposed provides a charge that is not homogeneous either from the point of view of fuel and air or retained exhaust gases. The charge has the fuel stratified with a fuel rich region close to the ignition point, and the retained exhaust gas stratified with an exhaust gas lean region also close to the ignition point. This distribution of fuel, air and exhaust gas provides for a concentration of fuel and air in the region of ignition so a generally leaner overall fuel/gas ratio (gas comprises air plus retained exhaust gas) may be used without sacrifice in ignitability. Despite this overall leaner mixture, and the high temperature prevailing in the early part of the combustion cycle, the fuel/gas ratio close to the ignition point is sufficiently rich to be readily ignited and is not conducive to NOx formation. During the mid part of the combustion phase, where high NOx formation is experienced in a normal stratified fuel engine, the present process exhibits a leaning of the fuel/air ratio and a lowering of the temperature, with an increase in exhaust gas content of the combusting mixture. This combination of conditions are also not conducive to NOx formation. In the final part of the combustion phase the high concentration of exhaust gas due to the stratification thereof in the combustion chamber will suppress the formation of NOx.

The foregoing disclosure emphasises how the regulation of the charge distribution in the combustion chamber can be used to achieve control of the formation of HC and NOx during the combustion process. This regulation of the charge distribution may be achieved by selected control of the degree of throttling of the inlet and exhaust ports and of the exhaust port timing of the engine. The throttling may be effected by appropriate valves at the inlet and exhaust port or in the ducts or passages communicating therewith.

Conveniently, the inlet is restricted by providing a butterfly type throttle valve in a port through which the air is drawn into the engine crankcase prior to being compressed in the crankcase to be delivered via a transfer passage or passages to the combustion chamber. This arrangement is selected because of the space constraints on locating a suitable valve in the internal transfer passage closer to the actual combustion chamber. Also, it is common for more than one transfer port to be provided for each combustion chamber, and it would be necessary to provide a valve in each such transfer port. The exhaust restriction may similarly be achieved by a valve in the exhaust port.

The movements of the respective valves may be effected by respective motors which may be electrically operated and controlled electronically. The valves may be operated by suitable solenoids or stepper motors controlled by an ECU (electronic control unit). Position sensors may be provided to supply feedback to the ECU relative to the actual position of the relevant valve to improve the accuracy of the positioning of the valve.

It will be appreciated that the strategy required to achieve any particular level of contaminants in the exhaust gasses and/or fuel consumption will vary for each different engine, firstly because the basic physical geometry of the engine influences the combustion process. Factors such as the size and location of the inlet and exhaust ports, the orientation of the inlet ports, and cylinder head and piston crown shape each exhibit varying degrees of influence on the gas flow in the cylinder and the combustion process. Secondly the exhaust system downstream of the exhaust port will influence gas flow in the cylinder by reason of the pressure pulses created at the exhaust port which may vary in timing and magnitude.

Accordingly, the degree of restriction of the gas flows in the inlet and exhaust ports must be determined experimentally for each engine design over the load and speed range of its operation. The degree of restriction will also be related to the required level of contaminants in the exhaust and/or the required fuel consumption. In some applications the fuel economy of the engine may be more important than exhaust contaminant level and so the control strategy would be different to that where exhaust contaminant level were to be strictly controlled.

The following discussion of the effects of the restriction of flow in the exhaust and inlet ports of an engine will give an appreciation of how these flows can be controlled to regulate the quantity of exhaust gas retained in the combustion chamber. The discussion relates to a three cylinder two stroke cycle engine of 1200 cc capacity operating over the speed range of 800 to 3000 RPM and load range of 0 to 25 Nm. The engine has direct in-cylinder fuel injection and crankcase compression air supply.

1. Very low speed (800 to 1000 RPM)

In this region the pressure pulsations in the exhaust system have a relatively long period in which to decay and are of a very low magnitude and so pulses in the exhaust system generally have little influence on the flow through the exhaust port and hence the control of exhaust gas retention level. At high loads the inlet port is only partly throttled and the exhaust is fully throttled so that the area available for drawing exhaust gas from the exhaust system back into the combustion chamber is reduced. At low loads the inlet port is throttled, and the engine is not sensitive to the degree of exhaust throttling, and the timing is optimised for high loads and low speeds. The exhaust port is preferably throttled to marginally improve exhaust gas purity.

Thus in the very low speed region a typical operation of the throttling of the inlet and exhaust ports is:

(a) High Loads: open inlet port throttle and close exhaust port throttle to reduce exhaust gas retention in combustion chamber.

(b) Low Loads: close inlet port throttle: increases exhaust gas retention in combustion chamber, open inlet port throttle, reduces exhaust gas retention, exhaust port throttle irrelevant.

2. Low Speeds (1000 to 2000 RPM)

In this region the exhaust port throttle is closed at both high and low loads, primarily to reduce the effect of undesirable pulses returning from the exhaust system. Closing the exhaust port throttle changes the time of arrival and magnitude of the pulse at the exhaust port at these speeds throttling of the exhaust port changes the timing of the returning pulse so lower pressure levels can be achieved in the combustion chamber at exhaust port closure. This in turn means that the inlet port throttle can be closed for the same air flow into the engine or alternatively the inlet port throttle can be left untouched and higher vacuum achieved, often with a slight increase in air flow. Reduced pressure in the combustion chamber at exhaust port closure also means less exhaust gas diluent is present, and therefore the exhaust gas/fuel ratio is richer, but exhaust gas/air ratios may be higher as the dilution levels are lower. These features are exhibited at both high and low loads because of the strength of the speed dependent returning pressure pulse in the exhaust system.

Thus in the low speed region a typical operation of the inlet and exhaust throttles at all loads are:

Close the exhaust port throttle to reduce quantity of exhaust gas retained.

Close the inlet port throttle to increase the amount of exhaust gas retained.

At full load (outside the range requiring emission control) the exhaust port is opened to a precise speed dependent value, as the timing of the positive pulse in the exhaust system is forced closer to that desired for full load performance.

3. Medium Speeds (2000 to 3000 RPM)

In this region the exhaust throttle can very accurately control the pressure at exhaust port closure, because of the timing and strength of a pressure pulse in the exhaust system. This will be the general case because the magnitude and adjustability of the pressure fluctuations will improve as speed increases, due to the decreased amount of attenutation arising from the reduced time between pulses, and the higher gas velocities and pressures developed.

At light loads the mechanism for exhaust gas retention control is the same as that mentioned above for low speeds. The preferred exhaust throttle setting moves from fully closed at light loads to fully open at high loads because this moves the pressure pulse such that a positive pulse arrives during the transfer port closure to exhaust port closure period. This reduces the quantity of exhaust gas in the cylinder, because the fresh charge can normally escape through the exhaust port at these higher speeds and throttle settings, and the pressure pulse prevents this from occuring. Thus, the trapped charge purity level is high. The inlet throttle settings at these loads are generally critical because HC and NOx is improved as the engine is throttled.

Thus in the medium speed range a typical operation of throttling of the inlet and exhaust ports is:

Low Loads: throttling the exhaust port reduces retained gas. Inlet port throttling increases retained gas.

High Loads: reduction of the throttling of the exhaust port decreases retained exhaust gas. Increasing the throttling of the inlet port increases retained exhaust gas.

It is to be understood that the above described operating strategy is to be taken as a typical example and it may be varied generally or in specific areas to suit differing requirements, engines, and operating conditions.

The invention will be more readily understood from the following description of typical operating strategies for the control of the exhaust port throttling, and of one practical arrangement of a two stroke engine incorporating controlled inlet and exhaust port throttling.

In the drawings:

FIG. 1 is a three dimensional map showing a typical plot of exhaust port throttle setting over the speed and load operating range of the 1200 cc capacity three cylinder two stroke engine previously referred to in this specification. The map has been developed for operation of the engine within the specific exhaust emission requirement for passenger automobiles operated in the U.S.A.

The control of the exhaust port position is controlled by a signal from an ECU which receives input signals indicating the engine speed and the air mass consumption of the engine which is indicative of engine load. The ECU has stored therein a map as represented by FIG. 1 and, from the speed and load input signals, determines from the map the required degree of throttling of the exhaust port and issues an appropriate signal to a drive mechanism coupled to a valve in the exhaust port.

Figure 1:
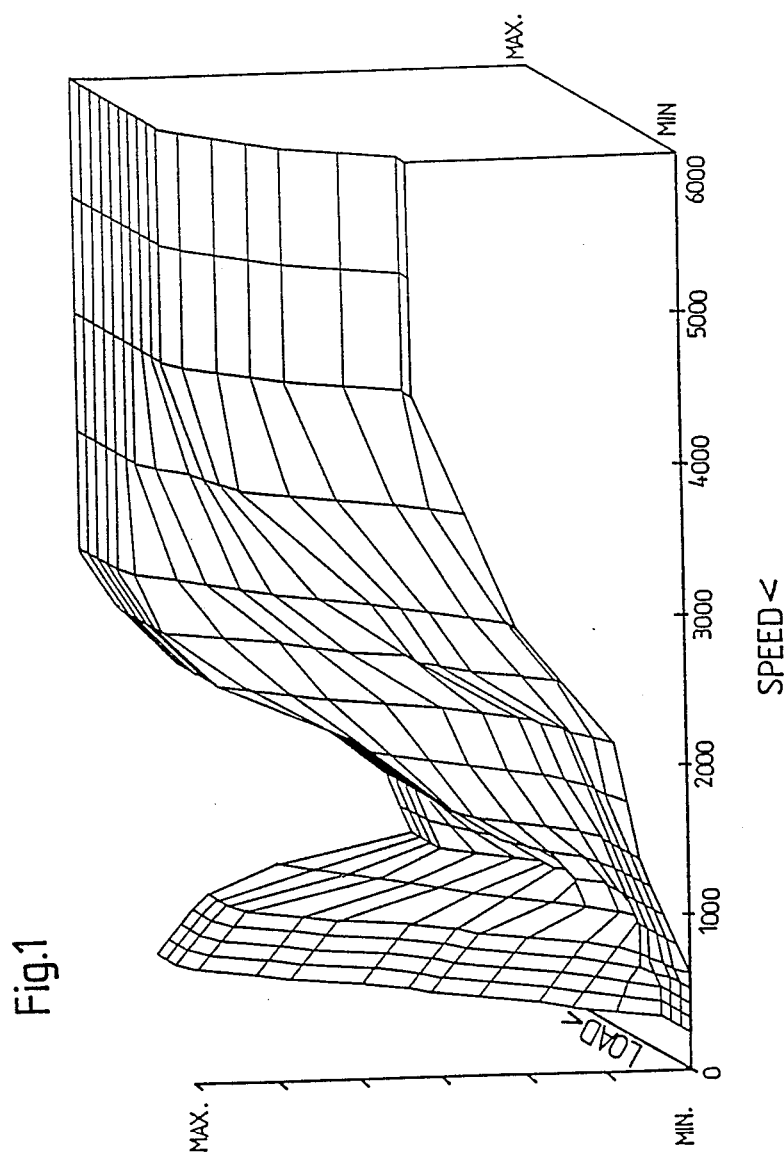
FIG. 1 is a three dimensional map of exhaust throttle valve position plotted against speed and load.

It is to be particularly noted from FIG. 1 that a substantial degree of throttling of the exhaust port is required over the medium and high load range at very low speeds. The degree of throttling decreases rapidly in the higher part of the low speed range, particularly at high load, and then progressively increases through the medium speed range to the high speed range. The significant change in the exhaust port throttling at high loads between the very low and high low speeds arises from the effects of the tuned exhaust system. It is therefore to be understood that the adjustment of the exhaust port can also be used to regulate the effects of a tuned exhaust system when operating at speeds out of the tuned speed range.

It is well known to use a tuned exhaust system on two stroke internal combustion engines, so that the arrival time of high and low pressure pulses at the exhaust port can be arranged to improve scavenging of the exhaust gases and entrapment of the fresh charge in the combustion chamber. However, tuned exhaust systems are speed dependent and with any particular exhaust system the correct or near correct timing of the pressure pulses at the exhaust port is only achieved over a relatively narrow range of engine speeds. The control of the gas flow through the exhaust port and/or the inlet port, and the timing of the exhaust port opening, as currently proposed can be used to vary the performance of the tuned exhaust system when engine operating conditions are such that the normal performance of the tuned exhaust system may operate adversely to the control of contaminants in the exhaust gas.

By way of example the throttling of the gas flow through the exhaust port may be varied to modify the high pressure pulses in the exhaust system at the time of closure of the exhaust port, so as to reduce the extent that fresh charge air is returned to the cylinder and thereby increase the ratio of exhaust gas to fresh charge gas trapped in the combustion chamber. Alternatively, if a low pressure pulse is present at the exhaust port at the time of closing thereof, which would normally lower the pressure in the combustion chamber, the degree of throttling of the flow through the inlet port may be reduced, and the exhaust port throttled to an extent to substantially close the port, thereby also bringing about an increase in the ratio of trapped exhaust gas to fresh charge air. It will therefore be understood that the control of the throttling of the exhaust port may be used to modify the effects of a tuned exhaust system both within or outside of the tuned speed range, and to either enhance or counter those effects as may be necessary for engine performance or contaminant control.

The map shown in FIG. 1 has been determined from test information obtained with the three cylinder two stroke engine previously referred to and, as stated hereinbefore, the physical geometry of the porting and combustion chamber of the engine, and other facts, will influence the required degree of throttling of the exhaust port over the engine speed and load range. However, the general trends of variations of the exhaust port throttling as represented in FIG. 1 will apply to crankcase compression, direct fuel-injected two stroke engines.

Figure 2:
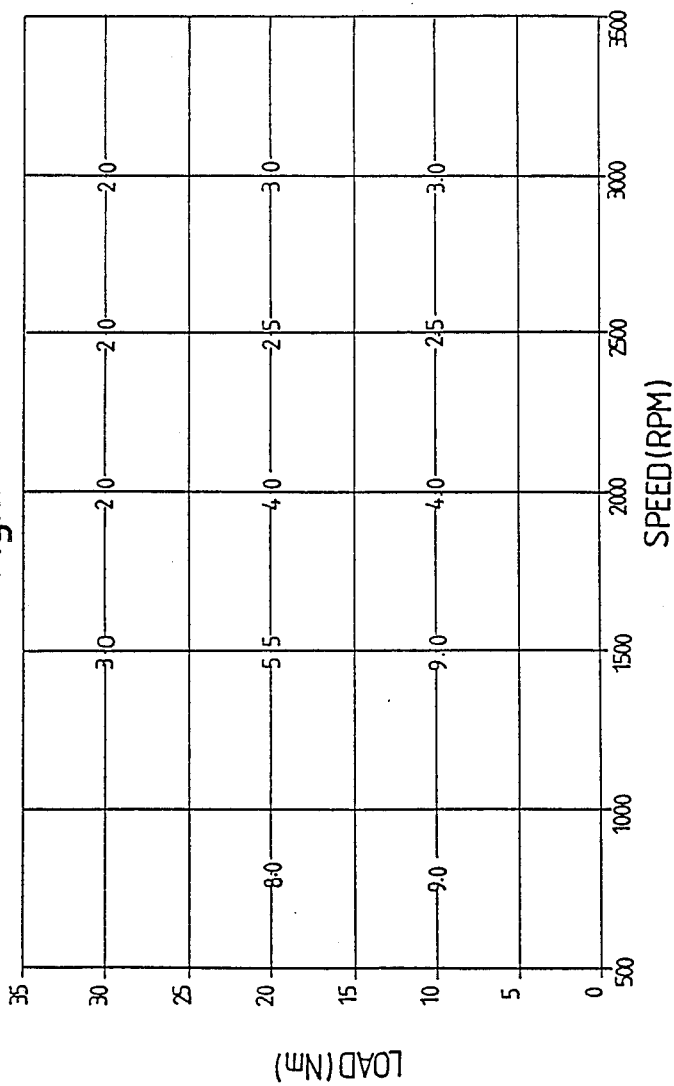
FIG. 2 is a chart of preferred positions of the exhaust port throttle at a range of points in the load and speed range of an engine.

There is shown in FIG. 2 a chart of the preferred settings of the exhaust port throttle valve in the engine to which the map in FIG. 1 applies. In this engine the exhaust port has an area of 1570 sq mm when unthrottled and 200 sq mm when fully throttled. The degree of throttling of the exhaust port is represented in the chart by numerals ranging from 0 to 10, in linear proportion to the degree of throttling and with 10 indicating the fully throttled position. The exhaust port throttle settings are shown for a range of speeds from 1000 to 4000 RPM and torques from 0 to 30 Nm.

Figure 3:
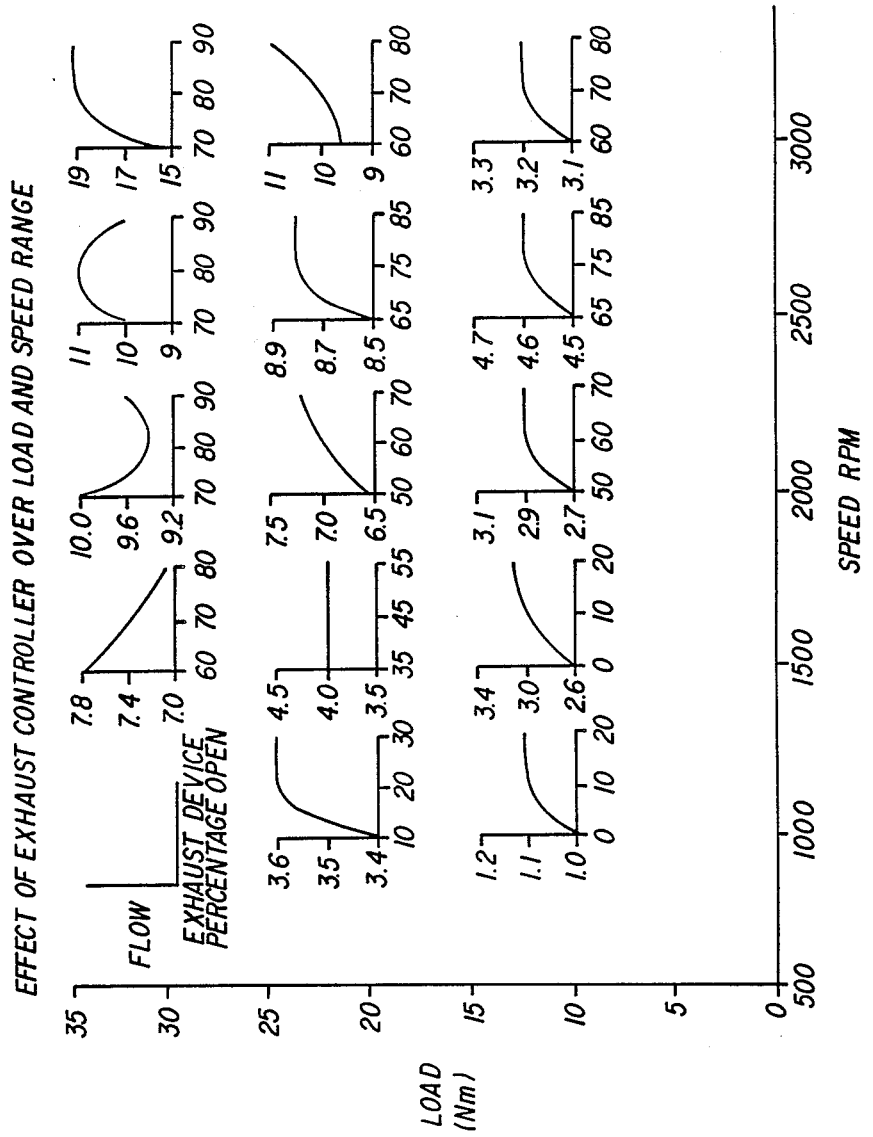
FIG. 3 is a chart similar to FIG. 2 showing the effects of variations in the exhaust port throttle position at various points in the load and speed range of the engine.

FIG. 3 is a chart for the same engine as FIG. 2 relates showing actual air flows through the exhaust port for exhaust throttle settings at typical speeds within the range shown in FIG. 2. At selected points on the chart a graph is drawn showing air flow against exhaust throttle setting. (The origin of each graph corresponds to the relevant point on the chart). The centre figure on each graph is the throttle setting shown in FIG. 2 and the figures on either side represent a variation of 10% in the throttle opening on either side of that setting. The left hand figures are for an increase in the extent of throttling and the right hand for a decrease in throttling. It will be noted from FIG. 3 that in the speed range of 1500 to 3000 RPM and torque range 10 to 30 Nm the 10% variation in exhaust port throttling has a significant effect on the gas flow through the exhaust port. As this gas flow is indicative of gas flows in the combustion chamber, and hence the rate of exhaust gas retained, the chart in FIG. 3 illustrates the importance of correct and accurate control of the exhaust port throttling.

In regard to FIGS. 1, 2 and 3 it is to be understood that the throttle in the air intake passage is positioned by an operator actuated control, such as an accelerator pedal or the like, to set the engine load demand.

The engine load having been so established the position of the throttle in the exhaust port is determined from a map, such as in FIG. 1, for the then curret speed of the engine, and the exhaust throttle moved to that position. Accordingly in this control strategy the ECU previously referred to does not control the position of the throttle in the air intake passage, but receives a signal responsive to that position as one input, and a signal corresponding to the engine speed, and determines the required position of the exhaust port throttle.

In a more advanced control strategy the position of the throttle in the air intake is also controlled by the ECU by way of a map of the same format as FIG. 1, plotting that throttle position against engine load and speed. A map such as is FIG. 1 is also stored in the ECU plotting exhaust throttle position against load and speed. The ECU receives an operator initiated signal indicating the engine load demand, and a signal related to the engine speed, and from these signals determines from the respective maps the correct position of the intake and exhaust throttles.

Figure 4:
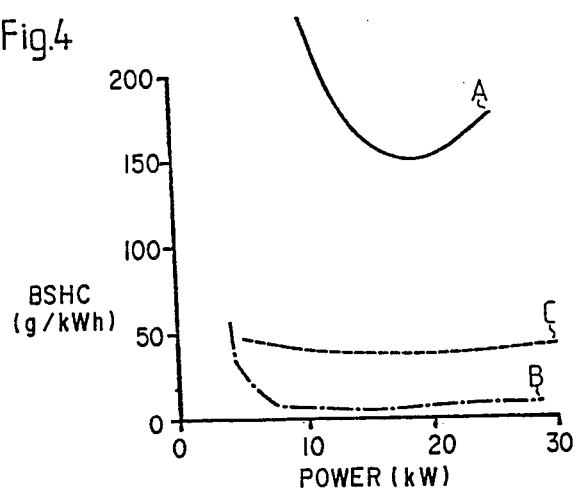
FIG. 4 is a graph comparing the HC emission of an engine operated in accordance with this invention and prior proposed engines.

FIG. 4 is a graph showing the rate of hydrocarbon emission against power output for three different engine setups. Plot A is the level of HC in grams per kilowatt hour obtained with a conventional crankcase compression, carburetted two stroke engine controlled throttling of the inlet port. Plot B is the level of HC obtained with basically the same engine when operated in accordance with the present invention, that is when the engine is fitted with direct in-cylinder fuel injection creating a stratified fuel charge and has throttle controls on the exhaust port and inlet port operated in accordance with the present invention. Both Plot A and B are based on an engine speed of 2000 RPM and Plot C has been modelled to the same speed.

Plot C has been developed as representative of the level of HC control obtained in another two stroke engine wherein the inlet and exhaust ports are throttled in a fixed relation in accordance with engine load and independent of engine speed. The Plot C was obtained from information published by Ricardo & Company Engineers (1927) Limited relating to the engine control system developed by the Nippon Clean Engine Company, this being the engine the subject of U.S. Pat. No. 3817227. The Ricardo publication is entitled A study of Stratified Charge Engines for Light Duty Power Plants - Report No. E.P.A., 460/3/74/011/A. The material used to produce plot C is taken from FIG. 7—7 on Page 272.

Although Plot C represents a substantial improvement over Plot A the HC levels in Plot C are far in excess of acceptable levels for engines used in automotive passenger vehicles under both United States and Australian standards. However Plot B indicates a level that would comply with both of these standards and represents a HC level in the range of 3 to 4 grams per miles on the driving cycle set down in these standards.

Figure 5:
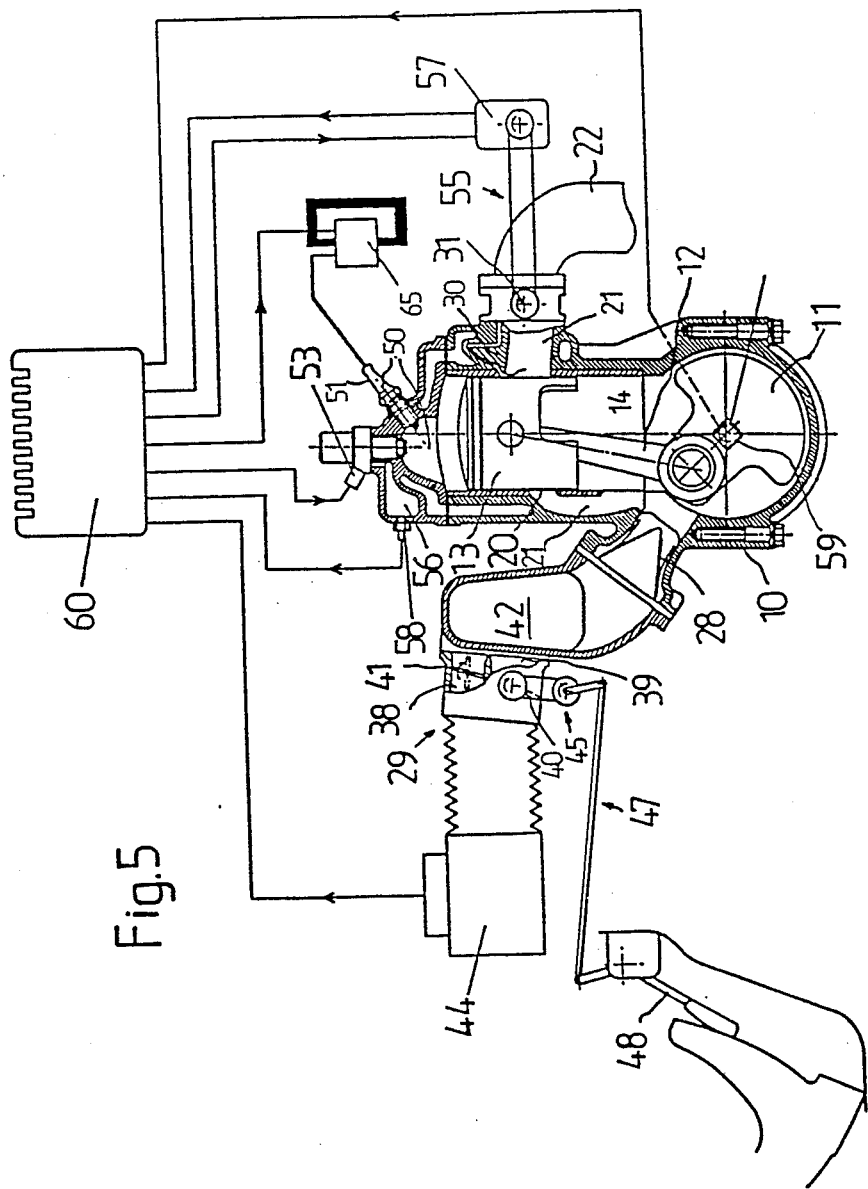
FIG. 5 is a longitudinal section view of a single cylinder engine equipped to operate in accordance with the present invention.

Referring now to FIG. 5 of the drawings, there is depicted a longitudinal cross-sectional view of a two stroke cycle internal combustion engine employing crankcase compression for the delivery of the air charge to the cylinder. It is, however, to be understood that the present invention may be applied to two stroke engines wherein the air supply is delivered from an alternative pressure source such as a turbocharger or supercharger. The engine comprises a crankcase 10 in which is journalled a crankshaft 11 for rotation about its axis and which is coupled by the connecting rod 12 to the piston 13. The piston 13 reciprocates in the cylinder 14 to induce rotation of the crankshaft 11 and, with the cylinder head 15 provides a variable volume combustion chamber.

At substantially diametrically opposite locations in the cylinder there are provided a transfer port 20 and an exhaust port 21, which are opened and closed by the piston as it reciprocates in the cylinder. The exhaust port 21 communicates with an exhaust system 22 which carries the exhaust gas to a suitable discharge point to atmosphere. The transfer port 20 is in communication with the interior of the crankcase 10 via the transfer passage 25. The air induction duct 26 communicates with the interior of the crankcase 10. The reed valve 28 is provided in the duct 26 to open and close in response to the pressure conditions in the crankcase 10.

The throttle valve 30 is mounted in the exhaust port for pivotal movement about the axis 31 so that it may vary the effective cross-sectional area of the exhaust port 21.

The exhaust port throttle valve 30 has a control edge 33 which extends in the circumferential direction of the internal face of the cylinder 14 and accordingly as the valve 30 pivots on the axis 31, the edge 33 varies the effective height of the exhaust port in the axial direction of the cylinder. It will thus be appreciated that the pivotal movement of the exhaust throttle valve 30 not only results in a throttling of the exhaust port but will also vary the timing of the opening and closing of the exhaust port 21.

Figure 6:
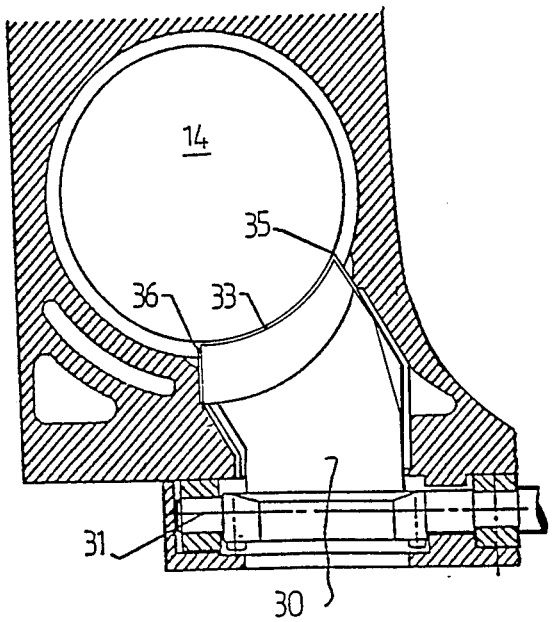
FIG. 6 is a sectional view through the cylinder and exhaust throttle as incorporated in the engine shown in FIG. 5.

More details of the exhaust port throttle valve 30 are shown in FIG. 6 wherein it is to be noted that the pivot axis 31 of the throttle valve 30 is inclined to the general direction of the control edge 33 of the throttle valve. This results in the end 35 of the control edge being at a greater radius, with respect to the pivot axis 31, than the other end 36 of the control edge. This inclined arrangement between the control edge 33 and the pivot axis 31 of the exhaust port throttle valve enables the throttle valve to be initially set up with the control edge 33 parallel to the upper edge of the exhaust port 21 although upon angular movement of the throttle valve, the control edge 33 will take up a progressively increasing angular relation to the top edge of the exhaust port. This enables the effective open area of the exhaust port to be varied at a greater rate than the variation of the height of the exhaust port. Accordingly, different rates of variation can be obtained in the exhaust port area and exhaust port timing. The extent of variation between these rates is controlled by the angle of inclination between the control edge 33 and the pivot axis 31 of the exhaust port throttle valve.

The air flow to the engine is regulated by the dual throttle valve assembly 29 comprising two side by side passages 38 and 39 each having a respective throttle valve 40 and 41, coupled to operate in unison over at least part of their range of travel. The passages 38 and 39 lead to the plenham chamber 42 from which air is distributed to the crankcase 10, or in the case of a multi cylinder engine to respective crankcase compartments one associated with each cylinder. In a multi cylinder construction there would also be a reed valve 28 for each crankcase compartment.

The air supply to the dual throttle unit 29 passes through the filter box 44 in which there is located an air flow sensor. The throttle valves 40 and 41 in the air passages 38 and 39 are coupled via the drive system 45 and linkage 47 to the driver operated accelerator pedal 48.

The cylinder head 15 includes a cavity 50 into which the majority of the air charge is compressed when the piston is at the top dead centre position of its travel in the cylinder. Projecting into the cavity is a conventional spark plug 51 and a fuel injection nozzle 52 being part of a fuel metering and injection unit 53. The exhaust throttle control valve 30 is coupled through the driver system 55 to the motor 57.

A temperature gauge 58 is provided in the water cooled galleries 56 of the cylinder head and the crankshaft speed and position sensor 59 is coupled to the crankshaft to provide an input to the electronic control unit (ECU) 60. The signal from the air flow sensor in the filter box 44 and from the temperature sensor 58 are also supplied to the ECU 60. The sensor 59 determines the speed of rotation of the engine crankshaft and issues an appropriate signal to the ECU. This signal also provides a base from which the position of the piston in the engine cycle can be determined.

It will be appreciated that these three inputs to the ECU provide the necessary information to enable the required load and the engine speed to be determined as well as the position of the piston in its reciprocating movement in the cylinder. The input from the temperature sensor in the cylinder head provides information to indicate the state of operation of the engine such as whether it is starting up from cold or whether it is running at its normal regulated temperature. From these inputs the ECU determines, from appropriate maps stored in the ECU, the fuel requirements of the engine together with the correct time in the engine cycle to effect injection of the fuel into the engine cylinder and to activate the spark plug. In addition the ECU from a map such as FIG. 1, determines the appropriate position of the exhaust port control valve so as to obtain the desired gas flow through the cylinder to achieve the desired level of emissions in the exhaust gases. The ECU issues to the motor 57 an appropriate signal to activate the exhaust valve in the determined position.

Figure 7:
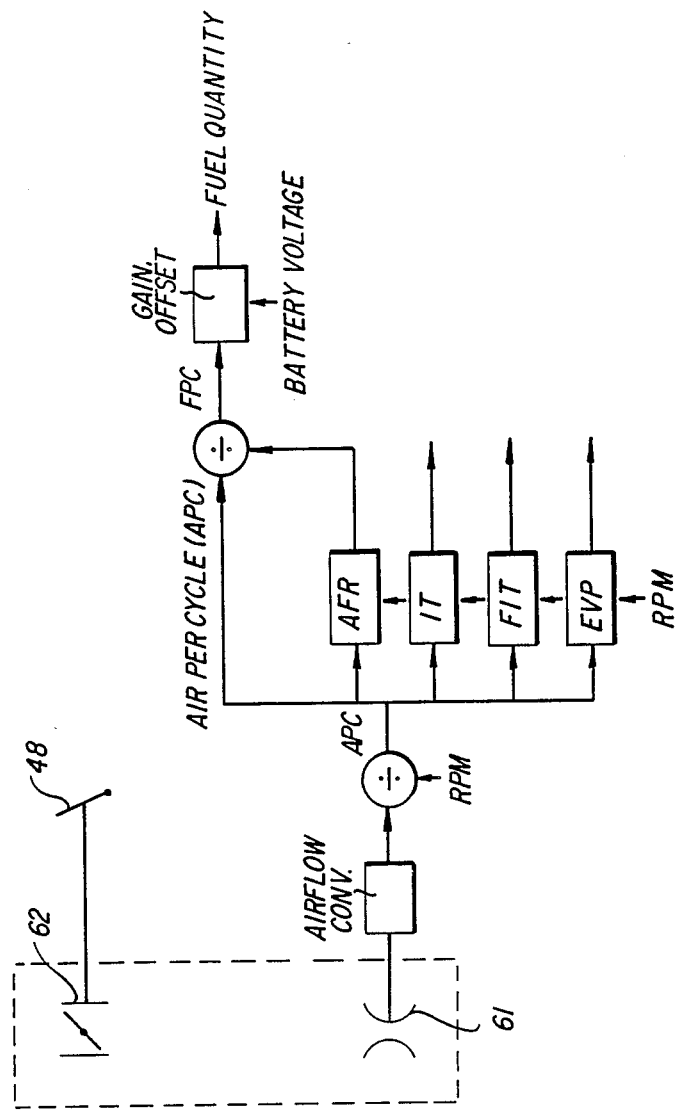
FIG. 7 is a simplified logic diagram of the electronic control system employed to regulate the position of the exhaust throttle and control fueling and ignition of the engine.

FIG. 7 of the drawings illustrates in a somewhat simplified from the logic diagram of the ECU which shall now be described. The air flow sensor 61, which corresponds to the sensor referred to previously, is located in the air flow path to the throttle 62 whereby the air flow sensor will provide a reading directly related to the rate of air supply to the engine. The output from the air flow sensor is a voltage varying in accordance with the rate of air flow and this signal is initially converted to a form acceptable to the ECU by the converter 64. The converted air flow signal is then processed with a signal from the sensor 59 indicating the engine speed in revolutions per minute, so as to achieve an output APC which indicates the quantity of air per cylinder per engine cycle being delivered to the engine. This APC signal is then fed to four maps pre-programmed into the ECU, the maps being an air fuel ratio map AFR, an ignition timing map IT, a fuel injection timing map FIT, and an exhaust valve position map EVP. Each of these maps also receives a signal from the sensor 59 indicating the RPM of the engine and the position of the piston within the engine cycle.

The resulting output signal from the air fuel ratio map is integrated with the air per cylinder per cycle signal by the divider 67 to provide a signal indicating the fuel requirement of the engine per cylinder per cycle FPC, which is in turn supplied to the fuel metering and injection unit 53 to control the quantity of fuel injected into each cylinder per cycle. The output from the ignition timing map is fed to an ignition timing controller 65 so that the spark plug will spark at the point in the engine cycle as has been determined from the spark timing map having regard to the engine speed and air flow. Similarly the output from the fuel injection timing map is fed to the fuel metering and injection unit 53 to set the time in the cylinder cycle at which injection is commenced and terminated. Finally the output from the exhaust valve position map is fed to the motor 57 to place the exhaust port control valve 30 in the required position as has been determined in relation to the air per cylinder per cycle (engine load) and engine speed inputs to the exhaust map. It is preferable for the motor 57 to have a position feed back system whereby a signal is returned to the ECU indicating the actual position of the exhaust valve, whereby a further correction may be made to the motor 57 if the actual position does not correspond to that determined by the output from the exhaust valve position map. The timing of the injection of the fuel is controlled from the injection timing map and the ECU. Alternatively a port may be controlled by a valve actuatable under the control of the ECU.

A fuel metering and injection method and device suitable for metering and delivering fuel to an engine operating in accordance with the invention herein are described in detail in Australian Patent Application No. 32132/84, the disclosure of which is hereby incorporated by reference for the teaching of the fuel metering and injection method and device therein.

An alternative fuel metering and injection method and device is described in Australian Patent Application No. 46758/85, the disclosure of which is hereby incorporated by reference for the teaching of the fuel metering and injection method and device therein.

In a modification of the control strategy the air flow sensor 61 is replaced by an operator actuated engine load demand signal generator, that will provide a signal input to the ECU that is directly fuel demand related.

It has previously been stated that the fuel is injected into the combustion chamber to form a stratified air-fuel distribution with the area in the immediate vicinity of the ignition device fuel rich. The fuel is preferably delivered to the combustion chamber entrained in air to promote a high degree of atomisation of the fuel Conveniently the fuel metering and injector unit 53 includes a chamber in which a metered quantity of fuel is collected, and the fuel is delivered from that chamber to the combustion chamber by a pulse of air. The pulse of air may automatically open a port to establish communication between the chamber holding the fuel and the combustion chamber, and the stratification of the fuel in the air within the combustion chamber is assisted by a preferred shaping of the cavity in the cylinder head, and the regulation of the extent of penetration of the fuel into the air charge in the combustion chamber.

A particularly advantageous shape of the cavity 50 is disclosed in the United States Patent Application lodged the same day as this application and entitled Improvements Relating to Two Stroke Cycle Internal Combustion Engines, inventors Christopher Kim Schlunke, and Robert Max Davis, the disclosure of which is hereby incorporated by reference for the teaching of the cylinder head cavity shape.

We claim:

1. A method of operating an internal combustion engine on the two stroke cycle to control the level of contaminants in the exhaust gases, the engine having a cylinder, a piston mounted to reciprocate in the cylinder, said piston and cylinder defining a combustion chamber that cyclically varies in volume as the piston reciprocates, an air inlet port providing communication between the combustion chamber and a source of air, and an exhaust port providing communication between the combustion chamber and an exhaust duct, said inlet and exhaust ports being arranged to be opened and closed by the piston as it reciprocates in the cylinder, said method comprising admitting a charge of air to the combustion chamber through the inlet port, compressing the charge of air in the combustion chamber by the movement of the piston after the inlet and exhaust ports have been closed, injecting a metered quantity of fuel into the air charge in the combustion chamber, igniting said fuel charge, and exhausting the products of combustion through the exhaust port after expansion in the combustion chamber, sensing the engine load demand and engine speed while the engine is operating, and regulating the mass of the products of combustion retained in the combustion chamber at closure of the ports so hydrocarbons present in the exhausted products of combustion are in predetermined limits by controlling the flow of gases through the exhaust port while open in relation to engine speed and load to provide a plurality of predetermined rates of gas flow in the combustion chamber over the full range of engine speeds and loads, said controlling including adjusting the degree of throttling of the exhaust port through a range of values between a minimum and a maximum, said degree of throttling of the exhaust port being preset in relation to engine load and speed.

2. A method of operating an engine as claimed in claim 1 wherein the control of the gas flow in the combustion chamber is effected by independently controlling the flow of air into the combustion chamber and the flow of products of combustion from said chamber, one of said flows being controlled in a predetermined relation to the sensed engine speed and the other of said flows being controlled in a predetermined relation to the sensed engine speed and engine load demand.

3. A method of operating an engine as claimed in claim 2 wherein the controlling of the flow of the products of combustion from said chamber includes adjusting the timing of the opening and closing of the exhaust port in response to the sensed engine speed.

4. A method of operating an internal combustion engine on the two stroke cycle to control the level of contaminants in the exhaust gases, the engine having a cylinder, a piston mounted to reciprocate in the cylinder, said piston and cylinder defining a combustion chamber that cyclically varies in volume as the piston reciprocates, an air inlet port providing communication between the combustion chamber and a source of air, and an exhaust port providing communication between the combustion chamber and an exhaust duct, said inlet and exhaust ports being arranged to be opened and closed by the piston as it reciprocates in the cylinder, said method comprising admitting a charge of air to the combustion chamber through the inlet port, compressing the charge of air in the combustion chamber by the movement of the piston after the inlet and exhaust ports have been closed, injecting a metered quantity of fuel into the air charge in the combustion chamber, igniting said fuel charge, and exhausting the products of combustion through the exhaust port after expansion in the combustion chamber, sensing independently the engine load demand and the engine speed while the engine is operating, controlling the air flow into the combustion chamber in accordance with the sensed engine load demand, and regulating the mass of the products of combustion retained in the combustion chamber at closure of the ports so hydrocarbons present in the exhausted products of combustion are in predetermined limits by controlling the flow of gases through the exhaust port while open in relation to engine speed and load to provide a plurality of predetermined rates of gas flow in the combustion chamber over the full range of engine speeds and loads, said controlling including adjusting the degree of throttling of the exhaust port through a range of values between a minimum and a maximum, said degree of throttling of the exhaust port being preset in relation to engine load and speed.

5. A method of operating an internal combustion engine as claimed in claim 4 wherein the engine is mounted for propulsion of a boat.

6. A method as claimed in claim 5 wherein the engine is an outboard marine engine.

7. A method of operating an internal combustion engine as claimed in claim 4 wherein the engine is mounted for propulsion of a motor vehicle.

8. A method of operating an engine as claimed in claim 1 wherein the flow of air into the combustion chamber and the flow of products of combustion from the combustion chamber are controlled to achieve said regulation of the mass of products of combustion retained.

9. A method of operating an engine as claimed in claim 8, wherein the fuel is injected into the combustion chamber to form a stratified fuel air chamber in the combustion chamber.

10. A method of operating an engine as claimed in claim 9 wherein the metered quantity of fuel is injected into the combustion chamber entrained in a gas.

11. A method of operating an engine as claimed in claim 1 wherein the controlling of the flow of gases in the combustion chamber includes adjusting the timing of the opening and closing of the exhaust port in relation to engine speed and load demand.

12. A method of operating an engine as claimed in claim 1 or 4 or 3 wherein the fuel is injected into the combustion chamber to form a stratified fuel air charge in the combustion chamber.

13. A method of operating an engine as claimed in claim 12 wherein the metered quantity of fuel is injected into the combustion chamber entrained in a gas.

14. An internal combustion engine operating on the two stroke cycle comprising a cylinder, a piston mounted to reciprocate in the cylinder, said piston and cylinder defining a combustion chamber that cyclically varies in volume as the piston reciprocates, an air inlet port providing communication between the combustion chamber and a source of air, and an exhaust port providing communication between the combustion chamber and an exhaust duct, said inlet and exhaust ports being arranged to be opened and closed by the piston as it reciprocates in the cylinder, and means for regulating the mass of the products of combustion retained in the combustion chamber at the closure of the ports by controlling the flow of gases in the combustion chamber in a predetermined relation to the entire operating range of engine load demand and engine speed at least in part by adjustment of the exhaust port over a range of positions, including intermediate positions, while the exhaust port is open so hydrocarbons present in the exhausted products of combustion are in predetermined limits.

15. An internal combustion engine as claimed in claim 14 wherein said means to control the flow of gases include a first means to control the flow of air into said chamber, a second means to control the flow of products of combustion from said chamber, and means operable in response to the engine load demand and engine speed to actuate said first and second means control means in a predetermined relation to regulate the mass of products of combustion retained in the combustion chamber at the closure of the ports.

16. An internal combustion engine as claimed in claim 14 wherein said means to control the flow of gases includes a first means to control the flow of air into said chamber, a second means to control the flow or products of combustion from said chamber, means operable to actuate one of said first and second control means in a predetermined relation to the engine load demand, and means operable to actuate the other one of said first and second control means in a predetermined relation to engine load demand and engine speed to regulate the mass of products of combustion retained in the combustion chamber at closure of the ports.

17. An internal combustion engine as claimed in claim 14 wherein the means to control the flow of gases includes means to adjust the timing of the opening and closing of the exhaust port in relation to engine speed and load demand.

18. An internal combustion engine as claimed in claim 14 including means to sense the engine speed and issue a signal representative of the engine speed, means to sense the engine load demand, an electronic control unit arranged to receive said speed and load demand signals and adapted to determine from said signals the required said gas flow in the combustion chamber and issue a signal representative of said gas flow, and means arranged to receive said gas flow signal and operable in response thereto to control the flow through at least one of the inlet and exhaust ports.

19. An internal combustion engine as claimed in claim 18 wherein said means operable in response to said gas flow signal controls the flow through the exhaust port.

20. An internal combustion engine as claimed in claim 14 wherein means are project to inject a metered quantity of fuel into an air charge in the combustion chamber each engine cycle.

21. An internal combustion engine as claimed in claim 20 wherein said injection means are adapted to inject the fuel in a manner to form a stratified fuel air charge in the combustion chamber.

22. An internal combustion engine as claimed in claim 21 wherein said injection means are operable to inject said fuel into said chamber entrained is a gas.

23. An internal combustion engine as claimed in claim 15 or 16 wherein one of said first and second means is operable to adjust the timing of the opening and closing of the exhaust port in relation to engine speed and load demand.

24. A fuel injected internal combustion engine operating of the two stroke cycle as claimed in any one of claims 15, 16, 17, 18 or 20 wherein the engine is mounted for propulsion of a boat.

25. A fuel injected internal combustion engine as claimed in claim 24 wherein the engine is an outboard marine engine.

26. A fuel injected internal combustion engine as claimed in any one of claims 15, 16, 17, 18 or 20 wherein the engine is mounted for propulsion of a motor vehicle.

27. In an engine propelled boat including a board hull, and a fuel injected internal combustion engine mounted to propel said boat and operable on the two stroke cycle, said engine comprising a cylinder, a piston mounted to reciprocate in the cylinder, said piston and cylinder defining a combustion chamber that cyclically varies in volume as the piston reciprocates, an air inlet port providing communication between the combustion chamber and a source of air, and an exhaust port providing communication between the combustion chamber and an exhaust duct, said inlet and exhaust ports being arranged to be opened and closed by the piston as it reciprocates in the cylinde, a method of operating said engine in said boat comprising admitting a charge of air to the combustion chamber through the inlet port, compressing the charge of air in the combustion chamber by the movement of the piston after the inlet and exhaust ports have been closed, injecting a metered quantity of fuel into the air charge in the combustion chamber, igniting said fuel charge, and exhausting the products of combustion through the exhaust port after expansion in the combustion chamber, sensing the engine load demand and engine speed while the engine is operating, and regulating the mass of the products of combustion retained in the combustion chamber at closure of the ports so hydrocarbons present in the exhausted products of combustion are in predetermined limits by controlling the flow of gases through the exhaust port while open in relation to engine speed and load to provide a plurality of predetermined rates of gas flow in the combustion chamber over the full range of engine speeds and loads, said controlling including adjusting the degree of throttling of the exhaust port through a range of values between a minimum and a maximum, said degree of throttling of the exhaust port being preset in relation to engine load and speed.

28. In an engine propelled boat as claimed in claim 27 wherein said engine is an outboard marine engine.

29. A marine engine operable on the two stroke cycle said engine comprising a cylinder, a piston mounted to reciprocate in the cylinder, said piston and cylinder defining a combustion chamber that cyclically varies in volume as the piston reciprocates, an air inlet port providing communication between the combustion chamber and a source of air, and an exhaust port providing communication between the combustion chamber and an exhaust duct, said inlet and exhaust ports being arranged to be opened and closed by the piston as it reciprocates in the cylinder, said engine being adapted to operate in accordance with a method comprising admitting a charge of air to the combustion chamber through the inlet port, compressing the charge of air in the combustion chamber by the movement of the piston after the inlet and exhaust ports have been closed, injecting a metered quantity of fuel into the air charge in the combustion chamber, igniting said fuel charge, and exhausting the products of combustion through the exhaust port after expansion in the combustion chamber, sensing the engine load demand and engine speed while the engine is operating, and regulating the mass of the products of combustion retained in the combustion chamber at closure of the ports so hydrocarbons present in the exhausted products of combustion are in predetermined limits by controlling the flow of gases through the exhaust port while open in relation to engine speed and load to provide a plurality of predetermined rates of gas flow in the combustion chamber over the full range of engine speeds and loads, said controlling including adjusting the degree of throttling of the exhaust port through a range of values between a minimum and a maximum, said degree of throttling of the exhaust port being preset in relation to engine load and speed.

30. A marine engine as claimed in claim 29 being an outboard marine engine.

31. In an engine propelled motor vehicle including a vehicle body, wheels supporting the vehicle body on the ground, and a fuel injected internal combustion engine operable on the two stroke cycle, said engine comprising a cylinder, a piston mounted to reciprocate in the cylinder, said piston and cylinder defining a combustion chamber that cyclically varies in volume as the piston reciprocates, an air inlet port providing communication between the combustion chamber and a source of air, and an exhaust port providing communication between the combustion chamber and an exhaust duct, said inlet and exhaust ports being arranged to be opened and closed by the piston as it reciprocates in the cylinder, a method of operating said engine in the vehicle comprising admitting a charge of air to the combustion chamber through the inlet port, compressing the charge of air in the combustion chamber by the movement of the piston after the inlet and exhaust ports have been closed, injecting a metered quantity of fuel into the air charge in the combustion chamber, igniting said fuel charge, and exhausting the products of combustion through the exhaust port after expansion in the combustion chamber, sensing the engine load demand and engine speed while the engine is operating, and regulating the mass of the products of combustion retained in the combustion chamber at closure of the ports so hydrocarbons present in the exhausted products of combustion are in predetermined limits by controlling the flow of gases through the exhaust port while open in relation to engine speed and load to provide a plurality of predetermined rates of gas flow in the combustion chamber over the full range of engine speeds and loads, said controlling including adjusting the degree of throttling of the exhaust port through a range of values between a minimum and a maximum, said degree of throttling of the exhaust port being preset in relation to engine load and speed.

32. An engine for a motor vehicle, said engine being a fuel injected internal combustion engine operable on the two stroke cycle and comprising a cylinder, a piston mounted to reciprocate in the cylinder, said piston and cylinder defining a combustion chamber that cyclically varies in volume as the piston reciprocates, an air inlet port providing communication between the combustion chamber and a source of air, and an exhaust port providing communication between the combustion chamber and an exhaust duct, said inlet and exhaust ports being arranged to be opened and closed by the piston as it reciprocates in the cylinder, said engine being adapted to operate in accordance with a method comprising admitting a charge of air to the combustion chamber through the inlet port, compressing the charge of air in the combustion chamber by the movement of the piston after the inlet and exhaust ports have been closed, injecting a metered quantity of fuel into the air charge in the combustion chamber, igniting said fuel charge, and exhausting the products of combustion through the exhaust port after expansion in the combustion chamber, sensing the engine load demand and engine speed while the engine is operating, and regulating the mass of the products of combustion retained in the combustion chamber at closure of the ports so hydrocarbons present in the exhausted products of combustion are in predetermined limits by controlling the flow of gases through the exhaust port while open in relation to engine speed and load to provide a plurality of predetermined rates of gas flow in the combustion chamber over the full range of engine speeds and loads, said controlling including adjusting the degree of throttling of the exhaust port through a range of values between a minimum and a maximum, said degree of throttling of the exhaust port being preset in relation to engine load and speed.

33. In an engine propelled boat including a boat hull, and a fuel injected internal combustion engine mounted to propel said boat and operable on the two stroke cycle, said engine comprising a cylinder, a piston mounted to reciprocate in the cylinder, said piston and cylinder defining a combustion chamber that cyclically varies in volume as the piston reciprocates, an air inlet port providing communication between the combustion chamber and a source of air, and an exhaust port providing communication between the combustion chamber and an exhaust duct, said inlet and exhaust ports being arranged to be opened and closed by the piston as it reciprocates in the cylinder, and means for regulating the mass of the products of combustion retained in the combustion chamber at the closure of the ports by controlling the flow of gases in the combustion chamber in a predetermined relation to the entire operating range of engine load demand and engine speed at least in part by adjustment of the exhaust port over a range of positions, including intermediate positions, while the exhaust port is open so hydrocarbons present in the exhausted products of combustion are in predetermined limits.

34. In an engine propelled boat as claimed in claim 33 said engine being an outboard marine engine.

35. A fuel injected marine engine operable on the two stroke cycle comprising a cylinder, a piston mounted to reciprocate in the cylinder, said piston and cylinder defining a combustion chamber that cyclically varies in volume as the piston reciprocates, an air inlet port providing communication between the combustion chamber and a source of air, and an exhaust port providing communication between the combustion chamber and an exhaust duct, said inlet and exhaust ports being arranged to be opened and closed by the piston as it reciprocates in the cylinder, and means for regulating the mass of the products of combustion retained in the combustion chamber at the closure of the ports by controlling the flow of gases in the combustion chamber in a predetermined relation to the entire operating range of engine load demand and engine speed at least in part by adjustment of the exhaust port over a range of positions, including intermediate positions, while the exhaust port is open so hydrocarbons present in the exhausted products of combustion are in predetermined limits.

36. A marine engine as claimed in claim 35 being an outboard marine engine.

37. In an engine propelled motor vehicle including a vehicle body, wheels supporting the vehicle body on the ground, and a fuel injected engine in the body and operable on the two stroke cycle said engine comprising a cylinder, a piston mounted to reciprocate in the cylinder, said piston and cylinder defining a combustion chamber that cyclically varies in volume as the piston reciprocates, an air inlet port providing communication between the combustion chamber and a source of air, and an exhaust port providing communication between the combustion chamber and an exhaust duct, said inlet and exhaust ports being arranged to be opened and closed by the piston as it reciprocates in the cylinder, and means for regulating the mass of the products of combustion retained in the combustion chamber at the closure of the ports by controlling the flow of gases in the combustion chamber in a predetermined relation to the entire operating range of engine load demand and engine speed at least in part by adjustment of the exhaust port over a range of positions, including intermediate positions, while the exhaust port is open so hydrocarbons present in the exhausted products of combustion are in predetermined limits.

38. An engine for a motor vehicle, said engine being fuel injected internal combustion engine operable on a two stroke cycle and comprising a cylinder, a piston mounted to reciprocate in the cylinder, said piston and cylinder defining a combustion chamber that cyclically varies in volume as the piston reciprocates, an air inlet port providing communication between the combustion chamber and a source of air, and an exhaust port providing communication between the combustion chamber and an exhaust duct, said inlet and exhaust ports being arranged to be opened and closed by the piston as it reciprocates in the cylinder, and means for regulating the mass of the products of combustion retained in the combustion chamber at the closure of the ports by controlling the flow of gases in the combustion chamber in a predetermined relation to the entire operating range of engine load demand and engine speed at least in part by adjustment of the exhaust port over a range of positions, including intermediate positions, while the exhaust port is open so hydrocarbons present in the exhausted products of combustion are in predetermined limits.

39. A method of operating an internal combustion engine on the two stroke cycle to control the level of contaminants in the exhaust gases, the engine having a cylinder, a piston mounted to reciprocate in the cylinder, said piston and cylinder defining a combustion chamber that cyclically varies in volume as the piston reciprocates, an air inlet port providing communication between the combustion chamber and a source of air, and an exhaust port providing communication between the combustion chamber and an exhaust duct, said inlet and exhaust ports being arranged to be opened and closed by the piston as it reciprocates in the cylinder, said method comprising admitting a charge of air to the combustion chamber through the inlet port, compressing the charge of air in the combustion chamber by the movement of the piston after the inlet and exhaust ports have been closed, injecting a metered quantity of fuel into the air charge in the combustion chamber, igniting said fuel charge, and exhausting the products of combustion through the exhaust port after expansion in the combustion chamber, sensing the engine load demand and engine speed while the engine is operating, and regulating the mass of the products of combustion retained in the combustion chamber at closure of the ports so hydrocarbons present in the exhausted products of combustion are in predetermined limits by controlling the flow of the gases in the combustion chamber in a predetermined relation over the entire range of engine speed and load conditions at least in part by adjustment of the exhaust port over a range of positions, including intermediate positions.

* * * * *